May 4, 1948.  F. W. LEE  2,440,693
METHOD FOR DETERMINING THE SUBTERRANEAN EXTENSION OF GEOLOGIC BODIES
Filed May 29, 1942   3 Sheets-Sheet 1

FREDERICK W. LEE
INVENTOR

BY J. F. Mothershead
ATTORNEY

May 4, 1948.  F. W. LEE  2,440,693
METHOD FOR DETERMINING THE SUBTERRANEAN EXTENSION OF GEOLOGIC BODIES
Filed May 29, 1942  3 Sheets-Sheet 2

FREDERICK W. LEE
INVENTOR

BY
ATTORNEY

FREDERICK W. LEE
INVENTOR

BY J. F. Motherhead
ATTORNEY

Patented May 4, 1948

2,440,693

UNITED STATES PATENT OFFICE 2,440,693

METHOD FOR DETERMINING THE SUBTERRANEAN EXTENSION OF GEOLOGIC BODIES

Frederick W. Lee, Owings Mills, Md.

Application May 29, 1942, Serial No. 445,000

2 Claims. (Cl. 175—182)

(Granted under the act of March 3, 1883, as amended April 30, 1928; 370 O. G. 757)

The invention described herein may be made and used by and for the Government of the United States for governmental purposes without the payment to me of any royalty therefor.

This invention relates to methods which are especially adapted to delineate geologic bodies using drill holes, mine shafts, drifts and adits in conjunction with the ground surface by electrical methods. This electrical method is a further extension of the Lee partitioning method, U. S. Patent No. 1,951,760, granted March 20, 1934, and its wider application in U. S. Patent application Serial No. 333,752, filed May 7, 1940, now Patent No. 2,345,608, granted April 4, 1944.

An object of this invention is to provide a new method and new combinations of methods of measuring under certain specified conditions, with current and potential electrodes applied to the earth, ground current and potential fields in a new manner enabling determination of the proximity and extension of subterranean geologic bodies in the field under examination. By the use of new methods according to this invention, it is possible to determine the proper direction for off-setting an oil, gas, water, salt, sulfur and like well, or the proper direction for drilling a second well in a better location, using an exploratory well or wells, previously drilled. The invention applies in the same way to mineral mining, for determining the extension of ore bodies, using diamond drill holes, stopes, or other underground locations such as old shafts, adits, drifts, and like means of access to subterranean points, as centers for observation at which one or more electrical subsurface ground contacts can be obtained.

Other and further objects and advantages of the invention will be apparent from the following description of preferred modes of applying it to terrain typically illustrative of that encountered in any form of geologic investigation, herein exemplified by oil- and mineral- bearing geologic bodies. It will be understood that if one is searching for a body more or less conductive than the surrounding geologic formation, lower or higher resistivity indications, respectively, will be sought, and that when one of these characters of indication is referred to hereinafter, it is intended to exemplify the other as well.

In the accompanying drawings illustrative of certain preferred applications of the invention:

Figure 1:
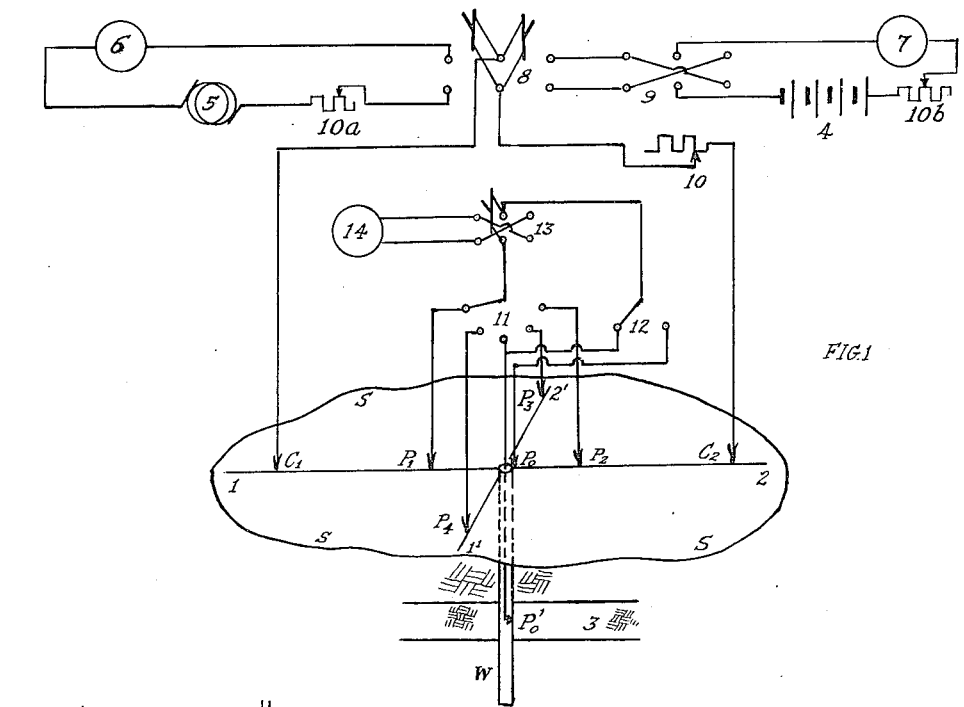
Fig. 1 illustrates a general application of the invention to a geologic structure having a ground surface S and providing access to the subsurface, exemplified by well W.
Figure 2:
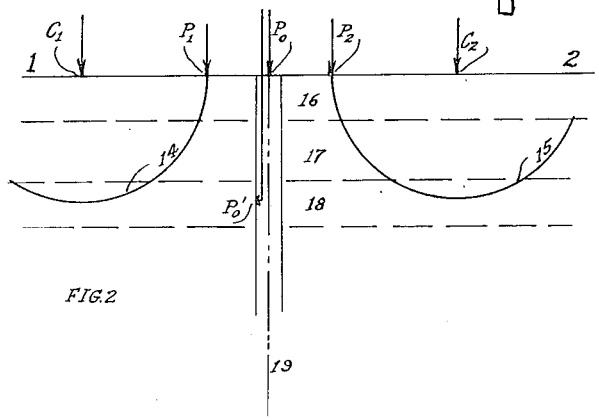
Fig. 2 is a diagrammatic earth section taken along line 1—2 of Fig. 1, showing isotropic subsurface conditions.
Figure 4:
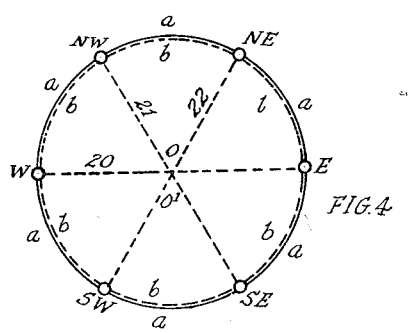
Fig. 4 is a vector or contour diagram of measurements made according to Figs. 2 and 3 under isotropic conditions.
Figure 5:
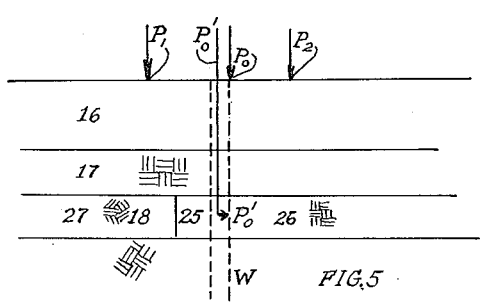
Fig. 5 is a diagram similar to Fig. 2 showing anisotropic subsurface conditions.
Figure 7:
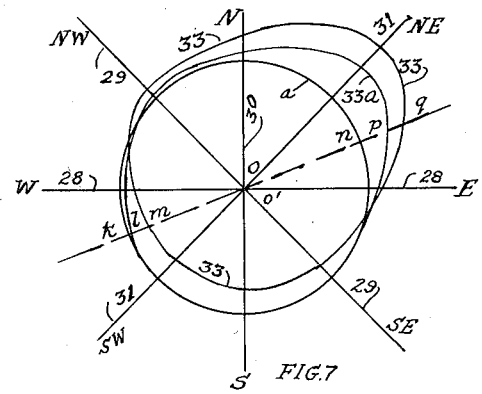
Figure 6:
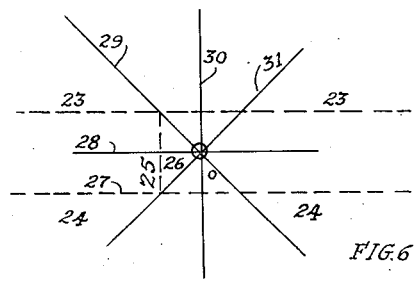
Fig. 6 is a plan view of Fig. 5.
Figure 8:
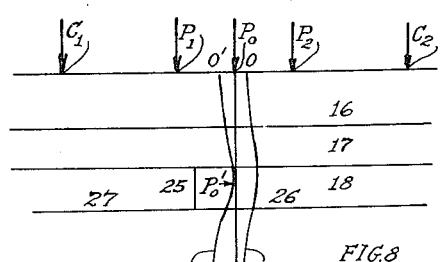
Figure 10:
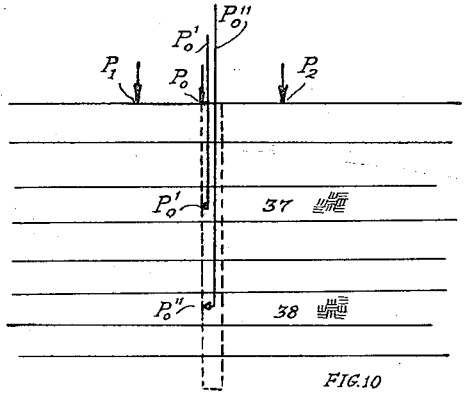
Figure 9:
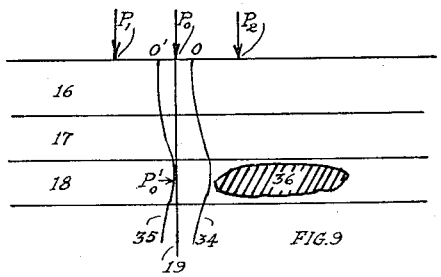
Figure 11:
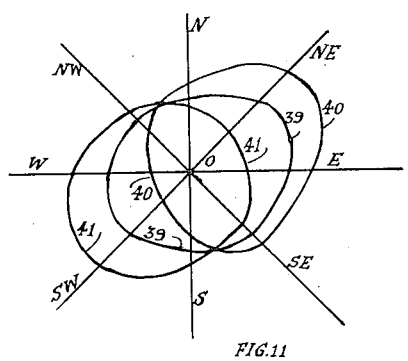
Figure 12:
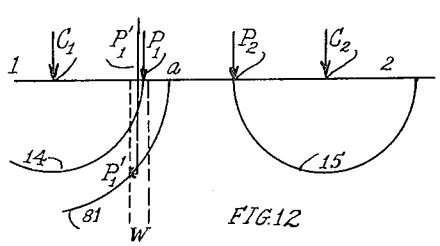
Figure 13:
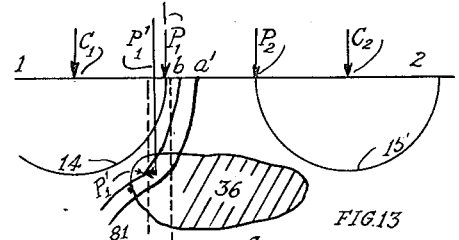
Figure 14:
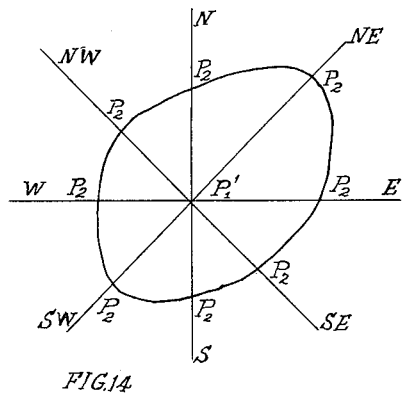
Figure 15:
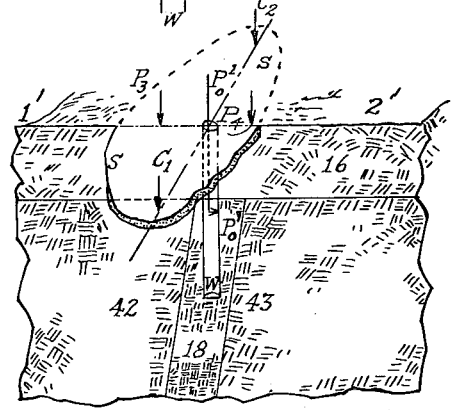
Figure 17:
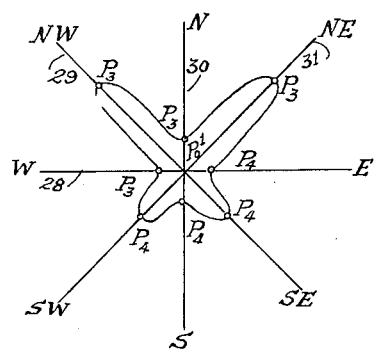
Figure 16:
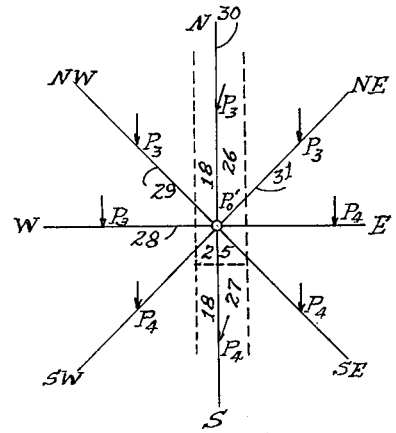
Figure 18:
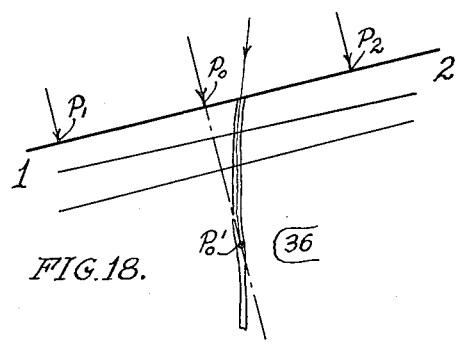

Fig. 7 corresponds to Fig. 4 and shows the warping effect on the vector or contour diagram of anisotropic conditions exemplified in Figs. 5 and 6;

Figs. 8 and 9 are diagrams similar to Fig. 2, showing the warping effect on the equipotential plane 19 of anisotropic conditions;

Fig. 10 is a diagram similar to Fig. 2, exemplifying the employment of a plurality of subsurface points of origin;

Fig. 11 shows a vector or contour diagram corresponding to Fig. 10;

Figs. 12 and 13 are diagrams similar to Fig. 2, of a modified application of the invention to isotropic and anisotropic terrain;

Fig. 14 is a vector or contour diagram corresponding to Fig. 13;

Figs. 15 and 16 are diagrams corresponding to Figs. 1 and 6, exemplifying examination of vertically oriented geologic bodies by means of transverse impedisivity measurements obtainable by the method of this invention;

Fig. 17 is a vector or contour diagram of transverse impedisivity measurements corresponding to Figs. 15 and 16; and Fig. 18 is a diagram corresponding to Fig. 2 showing a preferred mode of practicing the invention with markedly sloping terrain.

In my prior Patent No. 1,951,760, a center point of origin ($P_0$ herein), shown at substantially the same elevation as a straight base line connecting the current electrodes, $C_1C_2$, is employed as a reference, and the potentials relative thereto of further potential points, $P_1P_2$, likewise shown at substantially the same elevation as the straight base line, are measured. When such measured values, read with different azimuthal directions of the base line and using a constant value of ground current are plotted, using a sufficient number of azimuthal directions to approximate a continuous locus for the value of the vector (two values of which, 180° apart, are read as $P_0P_1$ and $P_0P_2$ with each base line orientation), then if the geologic body within the ground current field were isotropic, a circular locus, as $b$ in Fig. 4 herein, would be vectorially described. This circular locus in effect, indicates that the same number of equipotential shells (regarded as separated by definite constant differences of potential per unit of current passing in the earth) have been created in the earth between the points $P_0$ and the differently azimuthally located points $P_1$ (i. e. $P_2$). These shells may be visualized under ideal isotropic conditions as harmonic surfaces approximating hemispheres and lying within the limiting cases of (1) a plane surface half way between the two current electrodes (i. e. hemispheres with infinite radius) and (2) hemispheres of extremely small radius concentric with the current electrodes themselves. It will of course be understood that when the term "equipotential plane" is employed herein, it connotes near-planar equipotential shells, because when anisotropic conditions are present, either in the earth, by virtue of differences in ground-contact resistance effects, or by virtue of lack of symmetry of the configuration, the ideal electrical distribution can only be closely approximated.

The presence of anisotropic conditions within the current field affects the current distribution in the earth, modifies the shape of the equipotential harmonic surfaces, and displaces them so that the same number of shells will not necessarily appear between $P_0$ and $P_1$ in different azimuthal positions of the latter.

Thus, if the vector values $P_0P_1$ (i. e. $P_0P_2$) are measured in terms of potentials per unit of current flowing in the earth, to indicate the number of shells which have been forced into the regions embraced by $P_0$ and $P_1$ in various azimuthal positions of the latter, different values of the shell-indicating potential differences $P_0P_1$ will be found in the different azimuthal direction when anisotropic conditions are present. A typical resulting anisotropic vector diagram for the potential differences $P_0P_1$ under constant current conditions at substantially the same elevation as the base line, is shown in Fig. 7, vector locus $33a$.

Further, as explained in my above-mentioned application, when the terrain is isotropic horizontally, that is, in laminae parallel to the surface, if further electrodes $P_3$ and $P_4$ are located on a line normal to the center point $P_0$ of the base line, they will lie on the same equipotential plane as the center point $P_0$ and no transverse component of potential will appear between points on that equipotential plane. However, if anisotropic conditions exist, as in the case of steeply dipping stratified beds or intrusive geologic bodies, such as dikes or veins, faults and the like, the equipotential shells are warped and the points $P_0$, $P_3$ and $P_4$ will no longer lie on the same equipotential plane or shell, except in very unusual cases, and the potentials appearing between $P_0$ and $P_3$ and between $P_0$ and $P_4$, reflecting the number of "shells" falling between them, give data indicating the presence and character of the anisotropic material in the region investigated.

In all of the above instances, when the potentials are measured between points at substantially the same elevation as the current base-line, the data obtained is that for an average of conditions existing between the base-line and the full depth of any substantial current conduction by the earth. This depth is generally considered to be of the order of one-third the distance between the two current electrodes $C_1$ and $C_2$ (see "Exploration Geophysics," J. J. Jakosky, 1st ed. (1940) Times-Mirror Press, Los Angeles, Calif., page 325). As a result it has heretofore been necessary, to obtain indications of the depth of anomalies, to conduct repeated re-investigations of the same regions with different electrode spacings in order to determine at what depth, as indicated by electrode spacings, the effect of an anomaly was first encountered as a change in the average indicated conditions from the surface to such depth.

Then it was possible, by repeated test at various stations, to determine whether the anomaly continued to make its presence more or less evident in the average figures reflected by the surface potential loci diagrams, and by repeatedly varying the size of the configuration, and its azimuthal orientation, a general idea of the depth and direction of subsurface anomalies could be obtained, as explained in my above identified application.

I have now discovered that it is possible to secure such information more accurately and reliably, with the expenditure of much less time and effort, by largely eliminating from the indications anomalies lying close to the surface $P_0$ point, and making measurements in a new manner in which the effect of anomalies in a particular body lying at a considerable sub-surface depth is markedly increased as compared to the average of all overlying and underlying anomalies.

This better information can also be confirmed, and supplemented by information as to degree of extent of the anomaly, by combining with the data obtained in the new subterranean steps, data resulting from certain measurements of surface potentials in accordance with my above identified patent and application. The particular surface measurements of greatest utility for supplementing the data obtained by the new subterranean investigation step, to yield information not obtainable by either the new subterranean or old surface measuring steps alone, are obtained by surface measurements with the same $C_1C_2$, $P_1$ and $P_2$ electrical locations employed in obtaining the particularized data yielded by the new subterranean mode of procedure.

My present invention thus rests on the discovery that by making the potential point of origin $P_0'$ in the earth at an elevation removed from the elevation of the current contacts and instead located in the neighborhood of the particular strata or other geologic body under investigation, the effect on the measured values of the particular geologic body may be enhanced, particularly if the remainder of the "Lee partitioning method" or "five electrode method" configuration (see Jakosky, cited above, page 326) is proportioned generally in a predetermined manner in accordance with my invention.

Similar, though less sensitive results may be achieved by locating the remainder of the configuration in other than the preferred symmetrical relation to the point of origin $P_0'$, but as the symmetrical arrangement gives the best results, this arrangement is most completely described herein as exemplifying the invention by the best mode known of practicing the same.

This preferred mode of practicing the invention is exemplified in Figs. 1 to 11 and 15 to 18 herein. Referring to Fig. 1, W represents a well, shaft, bore-hole or any other means of access to a geologic body, indicated at 3. In accordance with this embodiment of the invention, a potential contact $P_0'$, intended to be the center of exploration, is made in the neighborhood of the region 3. A base-line point $P_0$ preferably designed to be the center point of the base-line, is then selected lying at a different elevation, which may be the surface of the earth, and preferably located on the normal line extending from the point $P_0'$ to the current base-line 1—2 of the Lee or similar configuration.

For best sensitivity, current is then introduced into the earth through current electrodes $C_1C_2$ positioned on the current base-line 1—2 on opposite sides of and at distances from the base-line center $P_0$ about 1½ times the distance $P_0P_0'$, and reference potential contacts $P_1P_2$ are made in any desired manner, but preferably at the one-third points of the line $C_1C_2$ as shown.

Any desired source of current, either A.-C., D.-C., or both, may be supplied to current electrodes $C_1C_2$; as from D.-C. source 4, limiting resistor 10b, current measuring device 7, and reversing switch 9, through connecting switch 8 and impedance controller 10; or as from alternator 5, current measuring device 6 and resistance 10a through connecting switch 8 and impedance controller 10. The illustrated arrangement of limiting resistor or impedance controllers 10, 10a and 10b is preferred, to enable separate adjustment of the A.-C. and D.-C. values relative to one another, and concurrent adjustment of both together.

Any desired means for measuring quantities reflecting the resistivity, or the earth potentials, at points $P_1P_2$, or when desired $P_3$ and $P_4$, or both, relative to $P_0'$, and when desired relative to $P_0$ for supplemental and confirmatory information, may be employed. In addition, the presence of anisotropic conditions, as reflected by the warping of the equipotential plane or shell passing through $P_0'$, may be qualitatively checked by the measurement of the potential difference existing between $P_0'$ and $P_0$, or between $P_0'$ and any other desired points located on the normal line mentioned above.

To facilitate the making of the desired measurements, I prefer to employ an arrangement as shown, in which the potential measuring instrument 14, with reversing switch 13, is connectable in any of the above-mentioned modes, by means of selective switches 11 and 12.

If desired, the method and apparatus of my prior patent, No. 2,277,707, granted March 31, 1942, may be employed to advantage in practicing the present invention, in which case "resistivity" values may be measured directly, as the "quantity" above-mentioned.

Furthermore with the special switch 8 and control impedances 10a and 10b it is possible to apply both A.-C. and D.-C. to the ground at the same time. If D.-C. is to be blocked from the A.-C. generator then 10a should be a capacity If A.-C. is to be blocked from the D.-C. generator or battery then 10b should be an inductance choke. The effect of applying D.-C. tends to build up differences of potential between different geologic beds which, when measured with either D.-C. or A.-C. facilitates differentiation as to the character of the bed contents. Conversely, the application of A.-C. under certain circumstances may be employed to diminish the natural potentials between the beds to facilitate differentiation in subsequent measurements with D.-C. or A.-C. Therefore, for completeness, both A. C. and D. C. sources have been disclosed in Fig. 1, but it should be appreciated that the depths at which observations can ordinarily be made employing A. C., of even very low frequency, are highly limited. Even low frequencies of alternating current produce the well-known "skin-effect" which causes the current to concentrate near the surface of the conductor, herein the earth's surface. The dense flow of current at such surface causes magnetic fields, which, as is well known, block flow of current in the body of the conductor remote from said surface. Therefore, while A. C. may be employed for observations close to the surface, it does not produce equipotential shells normal to the current paths at distances remote from the surface, as are produced when direct current is used. Thus, when observations are to be made at any considerable depth from the accessible region at which the current electrodes are placed, as a practical matter direct current must be employed.

The current control 10, shown as a resistance, serves to modify the current as desired. It may be an impedance of any type known to the art which can control either A.-C. or D.-C. or both. A potential measuring device, as a voltmeter, vacuum tube voltmeter, or potentiometer is shown at 14. The reversing switch 13 in the potential circuit may be used in combination with reversing switch 9 in the current circuit. The potentiometer 14 may be selective, i. e., may respond to A.-C. only, using inductive coupling, or to D.-C. only, by inductive chokes or D'Arsonval registration with long period movement; it may also be oscillographic, registering instantaneous potentials. The same, of course, applies for current measuring means 6 and 7.

With the arrangement shown in Fig. 1, applied to a region in which all strata 16, 17, 18 are horizontally isotropic and indicated in Fig. 2, the uniformity of spacing of the current and potential contacts $C_1C_2P_1P_2$ from the center of exploration $P_0'$ and from the comparison center $P_0$, will result in equal potential drops, i. e., resistivities, being measured between $P_0'$ on the one hand and $P_1$ and $P_2$ respectively, on the other; and the comparison observations will likewise produce equal values, due to the symmetry of the equipotential shells 14, 15 and 19 (Fig. 2).

Figure 3:
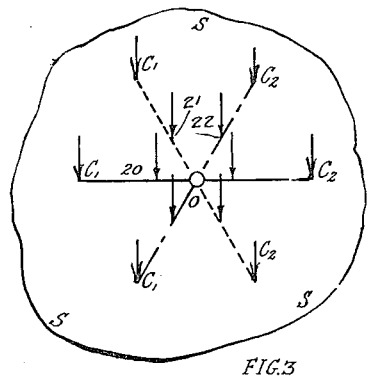
Fig. 3 is an orientation chart, showing a mode of shifting the line 1—2 of Fig. 1 into various azimuthal directions through the point of origin.

If now the quantities appearing between $P_0'$ on the one hand, and $P_1$ and $P_2$ on the other, be measured (and the check measurements be made between $P_0$ and $P_1$ and $P_2$ respectively) with the base-line $C_1C_2$ oriented in several different azimuthal directions 20, 21, 22, as shown in Fig. 3, the values so determined may be plotted as vector lengths extending in the respective azimuthal directions about the center of observation $P_0'$. As shown in Fig. 4, the locus of the ends of these vector lengths (associated in accordance with this invention to constitute a contour of the direction and extent of the resistivity values at the elevation $P_0'$), under isotropic conditions, will define a circle $a$ (shown in solid lines) with its center at $O'$, and the locus of the ends of the check measurement vector lengths representing the values $P_0P_1$, $P_0P_2$ in the several directions 20, 21, 22, when associated in accordance with this invention, will define a similar resistivity contour, again in the case of isotropic material having the shape of a circle $b$ (shown in dotted lines) about the point $o$ as a center. In Fig. 4, for ease of comparison, the centers $o$ and $o'$ are superimposed.

If, now, anisotropic conditions are present at or near the elevation of the center of observation $P_0'$, as shown in Figs. 5 and 6, in which the strata 16 and 17 are horizontally isotropic, while the stratum 18 is divided at 25 into portions 26 and 27 having different electrical properties, and readings are taken in various azimuthal orientations 28, 29, 30 and 31 (Fig. 6), the vector diagram of quantities measured about $P_0'$ (contour 33, Fig. 7) will no longer have a circular form, and the direction and extent of anisotropy will be reflected in the elongation or foreshortening of the vector quantities in the directions from $P_0'$ in which such anomalies occur. For comparison the circular contour of a diameter $k$—$n$ is superimposed in Fig. 7, on the contour of quantities 33 measured about point $P_0'$, and on the contour of comparison values $33a$ measured about $P_0$, the contours being respectively vectorally plotted about centers $o$ and $o'$, superimposed for ease of comparison.

As above-mentioned, the preferred position of the center of the base-line 1—2, at which the comparison point $P_0$ may be located, is on the normal line from $P_0'$ to the base-line 1—2. The comparison may be made when necessary, with any point lying on the equipotential plane or shell passing through point $P_0'$, and thus, when surface conditions are relatively isotropic, $P_0$ may be offset along the line 1'—2' (Fig. 1) extending perpendicularly to the base-line 1—2 and marking the intersection of the equipotential plane with the earth surface, or may be positioned at any other accessible point in the equipotential plane—defined by the line 1'—2' and the normal line extending therefrom to the center of exploration $P_0'$.

Fig. 8 illustrates the effect on the potentials in the vicinity of $P_0'$ and $P_0$, of anisotropic conditions. Referring to the ideal isotropic case, Fig. 2, theoretically the mid-plane of the configuration will coincide with and define the equipotential plane of half-potential, and all points on the plane 19 including $P_0'$ and $P_0$, would therefore, for ideal isotropic conditions have the same potential. When anisotropic conditions are present, as in Fig. 8, the reference plane 19, preferably at the center of the configuration, will no longer be an equipotential plane. The presence of anomalies displaces the equipotential shells or loci, two of which are represented at 34 and 35, so that the locus or "plane" of points equipotential with $P_0'$ will no longer, at the elevation of $P_0$ cut through that point, but under the conditions assumed in Figs. 5–8, will cut the surface at $o'$. The potential difference or other quantity measured between $P_0$ and $P_1$ (or $P_2$) will no longer equal the corresponding quantity measured between $P_0'$ and $P_1$ (or $P_2$), and to obtain equal values with surface measurements it would be necessary to move the point $P_0$ to $O'$, an indeterminate location in the absence of exploration about the point $P_0'$ in accordance with the present invention.

If the above-mentioned qualitative check is made by initially measuring the potential difference or other quantity appearing between $P_0'$ and $P_0$, it will be observed that the fact of anisotropism will be quickly established, and that by making the one measurement alone, with the configuration oriented in several azimuthal directions a quick estimate may be made of the direction in which the displacement, $P_0O'$ is greatest as a quick indication of the probable direction of extent of the geologic body at or in the vicinity of $P_0'$.

In other words, merely measuring the potential difference (or related quantity, such as resistivity, for example) between $P_0$ and $P_0'$, for different azimuthal orientations of the current configuration $C_1$—$C_2$ about the axis $P_0P_0'$, will, in the case of anisotropic material, show a variation of the potential difference with azimuth of current flow which, reduced to a "contour" as before mentioned, indicates by its major and minor radii the directions of subterranean extension of bodies near the point $P_0'$.

As above-mentioned, the measurements from point $P_0'$ to points $P_1$ and $P_2$ reflect not only anomalies lying at the point $P_0'$ (Fig. 8) but also those in the vicinity thereof, as illustrated in Fig. 9, in which the effect on the equipotential shells exemplified at 34 and 35, of a nearby body 36, is represented.

While greatest sensitivity is obtained with the current electrodes each spaced from $P_0$ about 1½ times the distance $P_0P_0'$ and on opposite sides thereof, valuable data may be collected at different depths of the center of observations, without moving the current electrodes $C_1C_2$ or the potential electrodes $P_1P_2$. As shown in Fig. 10, the invention contemplates the employment of a plurality of subsurface points of observation, or an ambulant subsurface observation, represented at $P_0'$ and $P_0''$. The qualitative indications may be quickly obtained by measuring potentials or quantities dependent thereon between $P_0$ and observation centers at various levels $P_0'$, $P_0''$ etc., if it is desired to find a bed level at which the making of more extended observations may be profitable. Furthermore, if, for example, one is interested in a bed at say the level $P_0''$, and cannot obtain a very great difference in vector quantities between it and the corresponding vector quantities about the surface comparison point $P_0$, one may locate a subsurface point, say at $P_0'$ where the equipotential plane is locally considerably warped, and by measuring the potentials $P_0'$—$P_0''$ in various azimuthal directions of the current field, obtain a wider variation of potential (reflecting the wider variation between conditions near $P_0'$ and $P_0''$, than that between the conditions at $P_0$ and $P_0''$) to facilitate observations.

Preferably, however, arrangements as exemplified in Fig. 10 are employed when several oil-bearing sands or other geologic bodies are being investigated. Under those circumstances, as shown in Fig. 11, the vector diagrams about check point $P_0$, and observation points $P_0'$ and $P_0''$, may have the forms shown at 39, 40 and 41, respectively. When such diagrams are obtained, it will be clear that diagram 39 combines the effects of the anomalies at all levels within the general depth of observation established by the size of the configuration used, while diagram 40 reflects predominantly the anomalies in the vicinity of $P_0'$, and diagram 41 reflects predominately the anomalies in the vicinity of $P_0''$. Under the conditions represented in Fig. 11, the higher of the two sands is seen to extend predominately in a northeasterly direction, the lower one to extend in a southwesterly direction. Thus one would locate new wells accordingly in planning to tap the desired sands. Diagram 39, which indicates extension in both the northeast and southwest direction does not differentiate each sand separately, and does not indicate in which direction new wells should be located to tap a particular one of the sands.

While the use of symmetrical configurations is desirable from the standpoint of ease and sensitivity, yielding two comparable azimuthal readings in opposite directions for each electrode setup, the same principles may be employed with a non-symmetrical arrangement.

Fig. 12 illustrates such application in the case of ideal isotropic conditions. It will be observed that under such conditions, as the configuration is rotated in azimuth the vector quantities $P_1'$—$P_2$ and $P_1$—$P_2$ will remain constant, respectively, and exhibit a constant potential difference represented by the differences in potential between equipotential shells 81 and 15 in the first case, and between shells 14 and 15 in the second, while the qualitative indication $P_1$—$P_1'$ will have a constant value for all azimuthal directions equal to the difference between the potential shells 14 and 81.

With this application, under anisotropic conditions exemplified in Fig. 13, the anisotropic body 36 causes warping of the equipotential shells, exemplified at $a'$ and $b$, and as the body 36 has different effects in different orientations of the configuration base-line $C_1$—$P_2$—$C_2$ about the observations points $P_1$—$P_1'$, the quantity measured between $P_1'$ and $P_2$ will have different vector values in the different directions, as plotted about $P_1'$, shown in Fig. 14, and interpretable as before. As in the previous vector diagrams, check readings of the less sensitive indications about $P_1$ (not shown) may also be plotted, if desired.

The present mode of obtaining azimuthal extension indications especially dependent on conditions at a desired sub-surface level is also applicable to the transverse modes of impedisivity factor measuring described in my copending application Serial No. 333,752, filed May 7, 1940, as exemplified in Figs. 15 to 17 herein. As shown in Figs. 15 and 16, suitable conditions for this application of my invention may be exemplified by a dike 18 of material to be investigated, striking upwardly through laterally disposed materials 42 and 43, the whole covered by an overburden 16.

To obtain indications of direction of strike and dip of such dike 18, much more sensitively and accurately than is possible while employing only a surface electrode arrangement of the invention of my above-mentioned application, a new sub-surface center of observation $P_0'$ may be employed according to the present invention, and transverse impedisivity reflecting quantities measured from the sub-surface electrode $P_0'$ to potential electrodes $P_3$ and $P_4$ disposed on a line $1'$—$2'$ extending transversely to the current base-line $C_1$—$C_2$.

Assume now, as shown in Fig. 16, that body 18 is divided by surface 25 into two bodies 26 and 27, of which 26 is more resistant than 27, as would occur if body 18 were a fault zone between geologic contacts 42 and 43, and mineralized in 27 by a conducting ore and not so mineralized in 26, and that bore hole W has struck into the non-mineralized region 26.

Under such conditions the measurement of quantities appearing between $P_0'$, in the body 18, and electrodes $P_3$ and $P_4$ (transversely positioned relative to the current base-line $C_1$—$C_2$), in various azimuthal positions of orientation of $P_3$ and $P_4$, (28, 29, 30, 31. Fig. 16) and the charting of the measured resistivities, resistances or potentials as vector quantities in the corresponding directions 28, 29, 30, 31, as in Fig. 17, yields a locus or contour passing through the vector points $P_3P_4$ having well defined maximum and minimum values. Under these conditions the larger values occur when the line of the potential ground contacts $P_3$—$P_4$ is at 45° to the extension of the geologic body and the minimum values occur when the line of the potential contacts parallels or is at right angles to the direction of extension of the body 18. Also the vector values reflecting resistivity are higher in the direction of the non-mineralized portion 26 of body 18, and lower in the direction of the mineralized portion 27. That is, $P_0'$—$P_3$ is greater than $P_0'$—$P_4$ on azimuths 29 and 31, while only small residual values appear on azimuths 28 and 30. The contour diagram, or the data supporting it, thus indicates that the high resistance body in question, 26, lies between the larger projections of the locus for high resistivities, i. e., between N. E. and N. W., and that the low resistance body in question, 27, lies between the S. W. and S. E. directions, herein directly south. Thus by taking high values in sequence on the periphery of the contour, or low values in sequence thereon, one is informed that the geologic body is defined between them.

As will be apparent from the above detailed description, if the earth's surface slopes as indicated in Fig. 18, the center of the base line 1—2 will preferably be located at the point of intersection with the earth's surface of a line drawn from the subterranean contact $P_0'$ perpendicular to the plane of the earth's surface (which perpendicular line may be termed the projection of the subsurface contact to the line connecting the current contacts), and the surface configuration of contacts will preferably be laid out or made symmetrically with respect to the point of intersection of said projection with the earth's surface.

In other words, regardless of the slope of the ground, I prefer to have the current contacts define the base of an isosceles triangle having the subterranean contact at its apex, and to make the potential measurements (which may be taken as representative of related quantities such as resistivity and the like) between the subterranean point on the one hand, and further potential contact points located symmetrically with respect to the base of said isosceles triangle (as nearly as is allowed by the conditions of the terrain), substantially removed from the influence of the local conditions at the current contacts, and preferably located on the base of the isosceles triangle at its center or third points, or on a transverse plane perpendicular to the center of said base, on the other hand.

Thus, in the preferred symmetrical form, the current electrodes $C_1$—$C_2$ define the base of an isosceles triangle with $P_0'$ at its apex, which base is preferably three times the height of the triangle along its apex median $P_0'$—$P_0$, and the potential contacts are located either on the base of the triangle (as $P_0$, $P_1$ or $P_2$) or on the plane determined by the point $P_0'$ and a line perpendicular to the mid-point of the base, as $P_0$, $P_3$, $P_4$ or $P_0''$.

It will be appreciated from Fig. 11 that by combining with these new readings, readings made about $P_0$ as a center in accordance with my prior patent and application, it is possible to determine whether the latter readings depart so markedly from similarity with the $P_0'$ readings as to indicate that they reflect the presence of another strata or geologic body, at a different elevation than $P_0'$, the presence of which may not previously have been known.

It will also be appreciated from Fig. 10, that by the making of observations at points represented by $P_0'$ and $P_0''$ traversing a given structure, the thickness of the structure may be closely determined without the necessity of repeating observations with different current electrode spacings as heretofore practiced.

As will be evident from the foregoing disclosures, the present new mode of rendering geologic extension observations especially dependent on conditions at the particular subsurface depth being investigated may be applied to the several fields of application of the normal conductivity measuring configurations, and can be employed to obtain data as to conditions underlying highly conductive overburden such as salt water beds near the surface and the like, which render the older surface observation of average conditions valueless or highly unreliable because of the obscuring effect of the overlying beds.

The invention is thus not limited to the particular embodiments and applications shown to illustrate its principles and practice.

I claim as my invention:

1. A method of geophysical prospecting from bore-holes extending at an angle from the normal to the earth's surface, as in the case of a nearly vertical hole in a steeply sloping terrain or a laterally drifted hole in a more nearly level terrain, which comprises making a potential contact at a subterranean point in the bore hole at the elevation to be investigated; making current contacts at the earth's surface symmetrically located not with respect to the point of penetration of the bore hole thereinto, but with respect to the projection of the said subterranean point normal to the approximate plane of the earth's surface, so that said current contacts define the base of a substantially isosceles triangle having the subterranean point at its apex and of which the bore hole is not a median; passing a current through said current contacts; measuring electrical quantities appearing between said subterranean contact and a point at the earth's surface in the current field of, but remote from, the points of current contact; and repeating the said measurement with the surface contacts positioned in the same relative relation to said subterranean contact but in sufficient different azimuthal orientations relative thereto to provide a contour of the variation of said measurement with azimuth, which reflects, and thus indicates, the azimuthal extension of geologic bodies located at approximately the depth of said subterranean potential contact.

2. The method of determining geologic extension at a deeply-buried region remote in depth from a pair of current electrodes inserted into a surface region of the earth, when one portion of said deeply-buried region is accessible by way of a drill hole or the like, which consists in spacing said current electrodes from each other in one azimuthal direction by a distance approximately three times the depth to said remotely-buried region, establishing a flow of direct current through the earth between said current electrodes to create a plurality of spaced equipotential shells in the earth, making a potential contact with the earth in said bore hole at the approximate depth of said remotely-buried region to tap the potential of the shell crossing the bore hole thereat, making another potential contact with the earth, at the surface region and spaced away from the drill hole by a distance approximately equal to one-half the depth of said remotely-buried region, to tap the potential of a shell spaced away from the drill hole and from said current electrodes, and measuring the difference in potential between said potential contacts; then rotating said configuration of current electrodes and potential contacts to each of a plurality of other azimuthal directions about said bore-hole contact as a zenithal center and repeating the said measurement in each of said azimuthal positions of rotation; so that comparing the resistivities indicated by said measurements for the respective azimuthal directions of orientation of the configuration can determine those directions which by maxima and minima resistivities indicate the presence of geologic extensions and bodies in those portions of the earth spaced away from the bore hole in proximity to said remotely-buried region.

FREDERICK W. LEE.

REFERENCES CITED

The following references are of record in the file of this patent:

UNITED STATES PATENTS

| Number | Name | Date |
| --- | --- | --- |
| 1,951,760 | Lee | Mar. 20, 1934 |
| 2,153,802 | Jakosky | Apr. 11, 1939 |
| 2,160,824 | Blau et al. | June 6, 1939 |
| 2,179,593 | Jakosky | Nov. 14, 1939 |
| 2,207,280 | Athy et al. | July 9, 1940 |
| 2,211,124 | Jakosky | Aug. 13, 1940 |
| 2,345,608 | Lee | Apr. 4, 1944 |